(12) United States Patent
Sano et al.

(10) Patent No.: US 7,927,762 B2
(45) Date of Patent: Apr. 19, 2011

(54) FUEL CELL CATHODE MANUFACTURING METHOD AND FUEL CELL MANUFACTURING METHOD

(75) Inventors: Atsushi Sano, Tokyo (JP); Satoshi Maruyama, Tokyo (JP)

(73) Assignee: TDK Corporation, Tokyo (JP)

( * ) Notice: Subject to any disclaimer, the term of this patent is extended or adjusted under 35 U.S.C. 154(b) by 919 days.

(21) Appl. No.: 10/591,016

(22) PCT Filed: Jun. 29, 2005

(86) PCT No.: PCT/JP2005/011966
§ 371 (c)(1),
(2), (4) Date: Aug. 29, 2006

(87) PCT Pub. No.: WO2006/008929
PCT Pub. Date: Jan. 26, 2006

(65) Prior Publication Data
US 2007/0167313 A1    Jul. 19, 2007

(30) Foreign Application Priority Data
Jun. 30, 2004  (JP) ................................. 2004-194660

(51) Int. Cl.
*H01M 8/00*        (2006.01)
(52) U.S. Cl. ........................................ 429/535; 29/623.1

(58) Field of Classification Search ................... 429/40, 429/41, 42, 43, 44; 502/101
See application file for complete search history.

(56) References Cited

U.S. PATENT DOCUMENTS

| 5,316,990 | A  | * | 5/1994 | Cooper et al. ................ 502/5 |
| 2003/0091889 | A1 | * | 5/2003 | Sotomura et al. ............ 429/40 |

FOREIGN PATENT DOCUMENTS

| CA | 2 453 024 A1 | 1/2003 |
| GB | 2 164 785 A | 3/1986 |
| JP | A-05-129023 | 5/1993 |
| JP | A-08-022827 | 1/1996 |
| JP | A-09-027327 | 1/1997 |
| JP | A-09-293517 | 11/1997 |
| JP | A-2003-109614 | 4/2003 |
| JP | A-2003-151567 | 5/2003 |
| TW | 211624 | 8/1993 |

* cited by examiner

*Primary Examiner* — Dah-Wei D Yuan
*Assistant Examiner* — Stephan Essex
(74) *Attorney, Agent, or Firm* — Oliff & Berridge, PLC

(57) ABSTRACT

The method of manufacturing a cathode for a fuel cell in accordance with the present invention is a method of manufacturing a cathode for a fuel cell equipped with a catalyst layer containing a catalyst, and includes a potential providing step of providing a precursor layer containing the catalyst with a potential higher than 1.3 V with reference to a standard hydrogen electrode, so as to form the catalyst layer.

5 Claims, 4 Drawing Sheets

FUEL CELL CATHODE MANUFACTURING METHOD AND FUEL CELL MANUFACTURING METHOD

TECHNICAL FIELD

The present invention relates to a method of manufacturing a cathode for a fuel cell and a method of manufacturing a fuel cell.

BACKGROUND ART

Attention has recently been focused on fuel cells as an energy supply source which has a high power generation efficiency and theoretically yields only water as a reaction product, while being excellent in environmental friendliness. Depending on species of electrolytes employed, such fuel cells are roughly classified into low-temperature operating fuel cells such as those of alkali, solid polymer, and phosphate types, and high-temperature operating fuel cells such as those of molten carbonate and solid oxide types. Among them, polymer electrolyte fuel cells (PEFCs) using a solid polymer s their electrolyte, which can attain a high density/high output in a compact structure while being operable in a simple system, have been widely studied not only as a stationary distributed power supply but also as a power supply for vehicles and the like, and have been greatly expected to come into practical use.

One of such PEFCs is a direct alcohol fuel cell which directly uses an alcohol as its fuel, in which a direct methanol fuel cell (DMFC) using methanol as its fuel has been known in particular. When methanol and water are supplied to an anode (fuel electrode) of the DMFC, methanol is oxidized by water, so as to generate a hydrogen ion. The hydrogen ion migrates through the electrolyte to a cathode (air electrode), thereby reducing oxygen fed to the cathode. According to these redox reactions, a current flows between both electrodes.

Thus, the direct alcohol fuel cell can directly use alcohol, which is a fuel, for power generation without modifying it into hydrogen and the like, and thus has a simple structure without necessitating a separate device for fuel modification. Therefore, the direct alcohol fuel cell can be made smaller and lighter very easily, and can favorably be used for a portable power supply and the like.

Each of the anode and cathode of the PEFC is constructed, for example, by two layers, i.e., a catalyst layer to become a reaction site for an electrode reaction and a diffusion layer for supplying a reactant to the catalyst layer, giving/receiving electrons, and so forth. As the catalyst contained in the catalyst layer, noble metals such as platinum, noble metal alloys, and the like are used in general.

Platinum is widely used as a catalyst for the cathode, since it can attain the highest redox current density among noble metals when forming an electrode and is stable even at a high potential. Alloys of platinum with other metals are widely used as a catalyst for the anode.

However, platinum is expensive and thus is a great obstacle to cost cutting and mass production for wider use of fuel cells. Therefore, catalysts substituting for platinum have been under consideration. For example, Patent Document 1 describes the use of a mixture of a metal complex and a metal oxide as a catalyst for a cathode. It also states that this apparently advances a 4-electron reduction reaction of oxygen. Patent Document 1: Japanese Patent Application Laid-Open No. 2003-151567

DISCLOSURE OF THE INVENTION

Problem to be Solved by the Invention

However, using the catalyst described in the above-mentioned Patent Document 1 for a cathode is problematic in that its redox potential is remarkably lower than that in the case using platinum, so that a sufficient current density is hard to obtain.

Even when platinum is used as a catalyst, the current density cannot be considered sufficiently high, whereby further improvement is also desirable in such an electrode.

In view of the problems of the prior art mentioned above, it is an object of the present invention to provide a method of manufacturing a cathode for a fuel cell and a method of manufacturing a fuel cell, which can improve a current density per unit area of an electrode in the fuel cell.

Means for Solving Problem

For achieving the above-mentioned object, the present invention provides a method of manufacturing a cathode for a fuel cell equipped with a catalyst layer containing a catalyst, the method including a potential providing step of providing a precursor layer containing the catalyst with a potential higher than 1.3 V with reference to a standard hydrogen electrode, so as to form the catalyst layer.

This manufacturing method can improve the catalytic activity by providing the precursor layer containing the catalyst with a potential in the potential providing step. The inventors infer that such an improvement in the catalytic activity is due to the fact that the potential provided oxidizes and eliminates impurities in the precursor layer and improves the conductivity of the catalyst. Improving the catalytic activity can ameliorate the current density of the electrode (the current density per unit electrode area when constructing and using a fuel cell). Further, the potential providing step can raise the potential inherent in the cathode, and thus can improve the cell voltage.

Preferably, the precursor layer is provided with a potential of 1.6 V or less with reference to the standard hydrogen electrode in the potential providing step.

Providing such a potential tends to be able to activate the catalyst more and improve the current density more. The rise in cathode potential tends to be able to improve the cell voltage more. When the potential is 1.3 V or less, the activation of the catalyst becomes insufficient, so that the current density improves insufficiently. When the potential exceeds 1.6 V, the catalyst is likely to be decomposed by oxidation, whereby the catalytic activity decreases.

Preferably, the precursor layer is provided with the potential by potential sweeping in the potential providing step. Providing the precursor layer with the potential by potential sweeping can activate the catalyst efficiently and sufficiently, and improve the current density of the electrode more fully.

Preferably, in the above-mentioned manufacturing method, the catalyst is a metal complex and/or a metal complex fired product formed by firing the metal complex.

The effect of improving the catalytic activity by the manufacturing method of the present invention can efficaciously be obtained in particular when using the metal complex and/or metal complex fired product as the catalyst. This seems to be because of the fact that providing the potential allows the valence of the center metal in the metal complex and/or metal complex fired product to attain a highly oxidized state, thereby improving the catalytic activity. Therefore, using the metal complex and/or metal complex fired product can dramatically improve the current density of the electrode.

More preferably, the metal complex has a porphyrin ring or phthalocyanine ring.

When such a metal complex and/or a metal complex fired product formed by firing the metal complex is used, the potential providing step dramatically improves the catalytic activity, whereby the current density of the electrode can be ameliorated dramatically. When the catalyst is activated, the cycle characteristic improves, whereby an electrode can be obtained with high output and high stability. The inventors infer that the potential providing step dopes a crystalline or amorphous porphyrin layer with an anion, so as to improve the conductivity greatly, or the porphyrin layer is rearranged by the potential provided, so as to form effective ion and electron conduction paths, whereby the effect mentioned above is obtained.

For attaining the above-mentioned effect more efficiently, it will be preferred if the above-mentioned metal complex includes at least one species of metal selected from the group consisting of Co, Fe, Ni, Cu, Mn, V, and Ru as a center metal.

Preferably, the above-mentioned manufacturing method includes a precursor layer forming step of forming the precursor layer by a coating method using a coating liquid made of the catalyst and a solvent adapted to dissolve or disperse the catalyst prior to the potential providing step. When the precursor layer is formed by the coating method, the effect of improving the catalytic activity by the above-mentioned potential providing step can be attained more sufficiently, whereby the current density of the electrode can be improved more fully.

The present invention also provides a method of manufacturing a fuel cell comprising an anode, a cathode, and a solid polymer electrolyte membrane arranged between the anode and cathode, the method including an electrode forming step of forming the cathode by the method of manufacturing a cathode for a fuel cell in accordance with the present invention.

This method of manufacturing a fuel cell can improve the current density of the resulting fuel cell, and fully ameliorate the energy density of a fuel cell system, since the cathode is formed by the method of manufacturing a cathode in accordance with the present invention. Also, the cell voltage can be improved sufficiently.

Effect of the Invention

The present invention can provide a method of manufacturing a cathode for a fuel cell which can improve the current density, and a method of manufacturing a fuel cell which can improve the energy density.

EXPLANATIONS OF NUMERALS

1 . . . solid polymer electrolyte membrane; 2 . . . anode catalyst layer; 3 . . . cathode catalyst layer; 4a, 4b . . . gas diffusion layer; 5 . . . separator; 5a . . . gas supply groove of the separator 5; 6 . . . gas seal; 10 . . . fuel cell

BEST MODES FOR CARRYING OUT THE INVENTION

In the following, preferred embodiments of the present invention will be explained in detail with reference to the drawings. In the following explanation, parts identical or equivalent to each other will be referred to with numerals identical to each other without repeating their overlapping descriptions.

Figure 1:
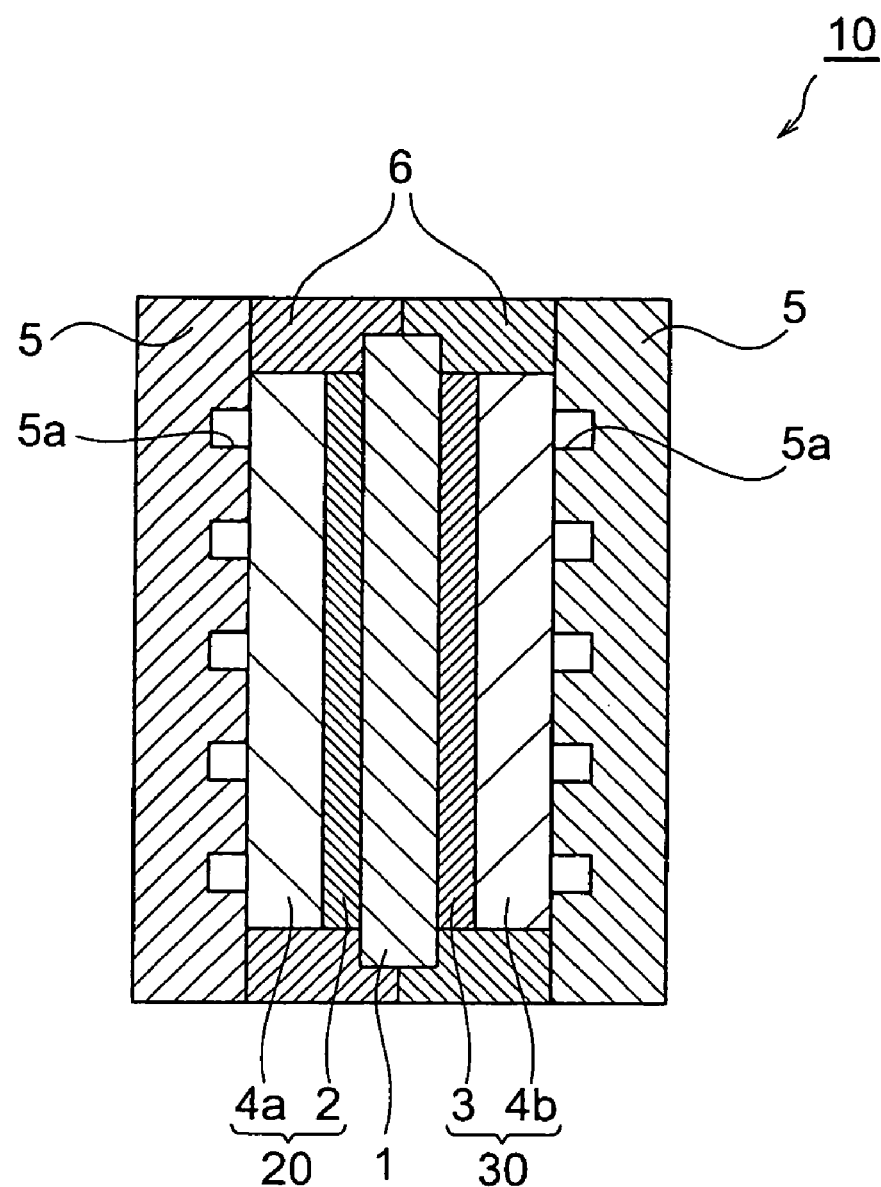
[FIG. 1] A schematic sectional view showing a fuel cell provided with a cathode obtained by a preferred embodiment of the method of manufacturing a cathode for a fuel cell in accordance with the present invention.

FIG. 1 is a schematic sectional view showing a fuel cell equipped with an electrode obtained by a preferred embodiment of the method of manufacturing a cathode for a fuel cell in accordance with the present invention. The fuel cell 10 shown in FIG. 1 is in the form of so-called membrane electrode assembly (MEA). The fuel cell 10 shown in FIG. 1 is mainly constructed by a solid polymer electrolyte membrane 1, an anode catalyst layer 2 and a cathode catalyst layer 3 which are in close contact with membrane surfaces of the electrolyte membrane 1, a gas diffusion layer 4a in close contact with the outer face of the anode catalyst layer 2, a gas diffusion layer 4b in close contact with the outer face of the cathode catalyst layer 3, and gas seals 6. Formed on the outside of the gas diffusion layers 4a, 4b are separators 5 in which respective grooves 5a are provided on the sides facing the gas diffusion layers 4a, 4b so as to become flow paths for reactants to be fed to the gas diffusion layers 4a, 4b.

In the fuel cell 10, an anode 20 is constructed by the anode catalyst layer 2 and the gas diffusion layer 4a, whereas a cathode 30 is constructed by the cathode catalyst layer 3 and the gas diffusion layer 4b. The gas diffusion layers 4a and 4b in the anode 20 and cathode 30 are typically made of porous conductive base materials. Though the diffusion layers 4a and 4b are not essential structures in the fuel cell 10, the anode 20 and cathode 30 are preferably provided with the diffusion layers 4 and 5, since they promote the dispersion of a fuel into the anode catalyst layer 2 and the dispersion of a gas into the cathode catalyst layer 3 while having a function of a collector.

A preferred embodiment of the method of manufacturing the cathode 30 in the fuel cell 10 will now be explained.

The method of manufacturing a cathode in accordance with the present invention is a method characterized in that the cathode catalyst layer 3 is formed by way of a potential providing step. The potential providing step is a step of providing a precursor layer, which becomes a precursor of the cathode catalyst layer 3, with a potential.

First, the precursor layer will be explained. The precursor layer is a layer containing a catalyst to be contained in the cathode catalyst layer 3. Its structure is not restricted in particular as long as it contains the above-mentioned catalyst, whereby its examples include a structure constructed by a catalyst alone, a structure including a catalyst and an ion exchange resin adapted to bind the catalyst, and a structure including a carrier catalyst in which a catalyst is supported by a carbon material and an ion exchange resin.

Here, examples of the catalyst include noble metals, noble metal alloys, metal complexes, and metal complex fired products formed by firing metal complexes.

An example of the noble metals is Pt. Examples of the noble metal alloys include alloys of Pt with Ru, Sn, Mo, Ni, Co, and the like.

Examples of the metal complexes include metal phthalocyanines such as iron phthalocyanine, cobalt phthalocyanine, copper phthalocyanine, manganese phthalocyanine, and zinc phthalocyanine; metal porphyrins such as iron tetraphenylporphyrin, copper tetraphenylporphyrin, zinc tetraphenylporphyrin, and cobalt tetraphenylporphyrin; and metal complexes such as ruthenium ammine complex, cobalt ammine complex, and cobalt ethylenediamine complex. Among them, the metal complex preferably has a porphyrin ring or phthalocyanine ring, more preferably includes at least one species of metal selected from the group consisting of Co, Fe, Ni, Cu, Mn, and V as a center metal.

Examples of the metal complex fired products include those formed by firing the metal complexes mentioned above. Preferred are those formed by firing the metal complexes having a porphyrin ring or phthalocyanine ring. More preferred are those formed by firing the metal complexes including at least one species of metal selected from the group consisting of Co, Fe, Ni, Cu, Mn, and V as a center metal.

Here, when yielding the metal complex fired product, the metal complex can be fired for 1 to 20 hours in an inert atmosphere at 500 to 800° C. When the above-mentioned carrier catalyst is used, it will be preferred if the firing is performed after the metal complex is carried by the carbon material. This tends to be able to yield a carrier catalyst in which the metal complex fired product is in close contact with the carbon material in a highly dispersed state. Using such a carrier catalyst can increase a three-phase boundary where the reactant, catalyst, and electrolyte membrane 1 coexist, whereby the electrode reaction can be generated efficiently.

Among these catalysts, the present invention preferably uses the metal complex and/or metal complex fired product. When the metal complex and/or metal complex fired product is used, providing a potential allows the valence of the center metal in the metal complex and/or metal complex fired product to attain a highly oxidized state, thus improving the catalytic activity, whereby the current density can greatly be improved. It seems that, when the above-mentioned preferred ones among the metal complexes and/or metal complex fired products are used in particular, providing a potential dopes a crystalline or amorphous porphyrin layer with an anion, so as to improve the conductivity greatly, or the crystalline or amorphous porphyrin layer is rearranged by the potential provided, so as to form effective ion and electron conduction paths, whereby the current density can be improved drastically. Also, activating the catalyst can improve the cycle characteristic, whereby an electrode having high output and high stability can be obtained.

From the viewpoint of forming a greater three-phase boundary, it will be preferred if these catalysts have an average particle size of 1 to 20 nm.

When such a catalyst is carried by a carbon material, examples of the carbon material include carbon black, activated carbon, carbon nanotubes, and carbon nanohorns. Preferred among them is carbon black. When using carbon black as the carbon material, its specific surface area is preferably 250 to 1000 $m^2/g$ from the viewpoint of forming a greater three-phase boundary. From the same viewpoint, the average primary particle size of the carbon material is 5 to 500 nm.

In the carrier catalyst, the amount of carried catalyst is preferably 10 to 85 mass % based on the total amount of the carrier catalyst. When the carried amount is less than 10 mass %, the amount of the catalyst in the catalyst layer tends to become insufficient, so that the three-phase boundary may not be secured sufficiently. When the carried amount exceeds 85 mass %, on the other hand, catalyst particles tend to aggregate together, thereby lowering the catalytic activity.

The ion exchange resin contained in the precursor layer if necessary functions as a binder for binding the carrier catalyst. The ion exchange resin is not restricted in particular as long as it can bind the carrier catalyst, but preferably has the same ion exchangeability as the ion exchange resin used in the electrolyte membrane 1 constituting the fuel cell 10. Namely, an anion exchange resin and a cation exchange resin are used when the electrolyte membrane 1 is formed by an anion exchange resin and a cation exchange resin, respectively. Consequently, ion conduction tends to be performed favorably in the contact boundary among the ion exchange resin, catalyst, and electrolyte membrane 1, thereby making it possible to improve the energy density.

Preferred as the anion exchange resin is one made of a polymer compound having a cation group within a molecule. Preferably, the cation group is at least one species selected from the group consisting of pyridinium, alkylammonium, and imidazolium groups. Examples of such an anion exchange resin include poly-4-vinylpyridine, poly-2-vinylpyridine, poly-2-methyl-5-vinylpyridine, and poly-1-pyridine-4-ylcarboxyethylene which are processed into quaternary ammonium. Here, poly-4-vinylpyridine can be processed into quaternary ammonium by causing poly-4-vinylpyridine to react with an alkyl halide such as methyl bromide or ethyl bromide.

For example, perfluorocarbon polymers having sulfonate groups, polysulfonate resins, and perfluorocarbon polymers having phosphonate groups or carbonate groups can be used as the cation exchange resin.

The content of the ion exchange resin is preferably 10 to 50 mass % based on the total amount of the precursor layer.

When the precursor layer has a structure constructed by a catalyst alone, the precursor layer can be formed by a vacuum deposition method or coating method, for example. In the case of forming by the coating method, the precursor layer can be formed by applying a coating liquid made of a catalyst and a solvent adapted to dissolve or disperse the catalyst onto the gas diffusion layer 4b, and drying thus applied liquid. Employable as the coating method are doctor blading, nozzle method, screen printing, gravure coating, die coater, and the like.

When the precursor layer has a structure including a catalyst and an ion exchange resin, the precursor layer can be formed by the above-mentioned coating method, for example. Employed as the solvent at this time is one which can dissolve or disperse the catalyst while being able to dissolve or disperse the ion exchange resin.

When the precursor layer has a structure including a carrier catalyst in which a catalyst is supported by a carbon material and an ion exchange resin, the precursor layer can be formed by the following procedure, for example.

First, a catalyst and a carbon material are mixed by a ball mill or the like, so as to yield a carrier catalyst. The mixing method, which may be either of dry or wet type, can be chosen as appropriate. When a metal complex fired product is used as the catalyst, it will be preferred if firing is effected after the mixing, so as to yield the carrier catalyst.

Thereafter, a binder liquid in which an ion exchange resin as a binder is dissolved or dispersed in a solvent is prepared, the carrier catalyst is mixed into the binder liquid, and the mixture is kneaded and formed into a coating. Here, the kneading and the forming of the coating can be effected by a typically employed kneader such as ball mill, biaxial kneader, or biaxial extruder.

Thus obtained coating is applied onto the gas diffusion layer 4b, and is dried, so as to form the precursor layer.

Employable as the coating method are doctor blading, nozzle method, screen printing, gravure coating, die coater, and the like.

The gas diffusion layer 4b is constructed by a porous body having an electronic conductivity, for example. Preferred as such a porous body are carbon cloth, carbon paper, and the like.

The thickness of the gas diffusion layer 4b is preferably 10 to 300 µm.

The potential providing step of providing the precursor layer constructed as mentioned above with a potential will now be explained.

In the potential providing step, the precursor layer is provided with a potential higher than 1.3 V with reference to a standard hydrogen electrode, so as to form a cathode catalyst layer 3. Here, the provided potential is preferably higher than 1.3 V but not exceeding 1.6 V, more preferably within the range of 1.4 V to 1.6 V.

Providing the precursor layer with the potential in the potential providing step can be effected by potential sweeping, holding of a constant potential, or constant-current electrolysis, for example.

When applying the potential by potential sweeping, the catalyst can be activated by sweeping the potential at a sweeping rate on the order of 0.1 mV/s to 500 mV/s while setting cutoff potentials to 1.4 V and 1.6 V, for example.

When applying the potential by holding a constant potential, the catalyst can be activated by holding the potential at a fixed potential of 1.5 V for a predetermined time while using a potentiostat, for example.

When applying the potential by constant-current electrolysis, the catalyst can be activated by causing such a current that the cathode potential is higher than 1.3 V to flow for a fixed time while using a galvanostat or a charging/discharging apparatus.

Performing such a potential providing step can oxidize and eliminate impurities in the precursor layer, ameliorate the conductivity of the catalyst, and improve the catalytic activity. This can improve the current density of the resulting electrode. It can also raise the potential of the cathode, thereby improving the cell voltage. When the applied potential is 1.3 V or less, the activation of the catalyst becomes insufficient, so that the current density improves insufficiently. When the applied potential exceeds 1.6 V, the catalyst is likely to be decomposed by oxidation, thus lowering the catalytic activity.

When providing the precursor layer with a potential within the above-mentioned range by potential sweeping, this process is performed such that the maximum potential at the time of potential sweeping falls within the above-mentioned range.

The making of the cathode for a fuel cell is completed by forming the catalyst layer 3 by the potential providing step.

A method of manufacturing the fuel cell 10 will now be explained.

The method of manufacturing the fuel cell 10 is a method of manufacturing a fuel cell comprising an anode 20, a cathode 30, and a solid polymer electrolyte membrane 1 arranged between the anode 20 and cathode 30, the method including an electrode forming step of forming the cathode 30 by the above-mentioned method of manufacturing a cathode for a fuel cell.

Here, an anion exchange membrane or cation exchange membrane is used as the electrolyte membrane 1. Employed as constituent materials for the anion and cation exchange membranes are the above-mentioned anion and cation exchange resins contained in the precursor layer as necessary, respectively.

The thickness of the electrolyte membrane 1 is preferably 10 to 300 µm.

The separators 5 are formed from a material having an electronic conductivity, whereas examples of this material include carbon, resin-molded carbon, titanium, and stainless steel.

The anode 20 can be made as with the cathode 30 except that the potential providing step is not performed. Preferred as the catalyst used in the anode catalyst layer 2 is a noble metal alloy, a metal complex, and/or a metal complex fired product. Preferred as the noble metal alloy in particular is Pt—Ru which is less likely to poison the catalyst.

The potential providing step may be performed at the time of forming the anode catalyst layer 2 as well. In this case, the conductivity of the anode 20 tends to improve.

In the method of manufacturing the fuel cell 10, the fuel cell 10 can be made by holding the electrolyte membrane 1 between the anode 20 and cathode 30, further holding them between the separators 5, and then sealing the resulting product with the gas seals 6.

Since the cathode is formed by the above-mentioned method of manufacturing a cathode for a fuel cell, thus made fuel cell 10 ameliorates its current density, thereby sufficiently improving the energy density of the fuel cell system. It sufficiently improves the cell voltage as well.

Thus obtained fuel cell 10 can use various fuels such as hydrogen and methanol as a reactant fed to the anode 20, and can favorably be used as PEFC or DMFC.

Though preferred embodiments of the present invention are explained in detail in the foregoing, the present invention is not limited to the above-mentioned embodiments. For example, while the above-mentioned embodiments relate to a case where a cathode is constituted by a catalyst layer and a diffusion layer, the method of manufacturing a cathode in accordance with the present invention can also be employed in the case where the cathode has no diffusion layer.

In this case, the precursor layer to become a precursor of the catalyst layer can be formed by vapor deposition or coating on a base material such as carbon paper, PET film, or PTFE film, or direct vapor deposition or coating on the electrolyte membrane 1, for example. The catalyst layer can be formed by performing a potential providing step for the precursor layer in this state.

The catalyst layer formed on the base material is transferred to the electrolyte membrane 1 when forming the fuel cell 10. The transfer can be effected by a method of joining the catalyst layers 2 and 3 to the electrolyte membrane 1 by hot press or the like, and then peeling off the base materials, and the like.

EXAMPLES

In the following, the present invention will be explained more specifically with reference to examples and comparative examples, though the present invention is not limited to the following examples.

Example 1

As a metal complex, 5,10,15,20-tetraphenylporphyrinatocobalt(II) (manufactured by Aldrich) was deposited by vacuum deposition onto a disk electrode having a diameter of 6 mm made of glassy carbon, so as to form a precursor layer made of a metal complex. Here, from the change in weight between before and after the deposition, it was proved that the amount of coating of the metal complex was 20 μg/cm².

Figure 2:
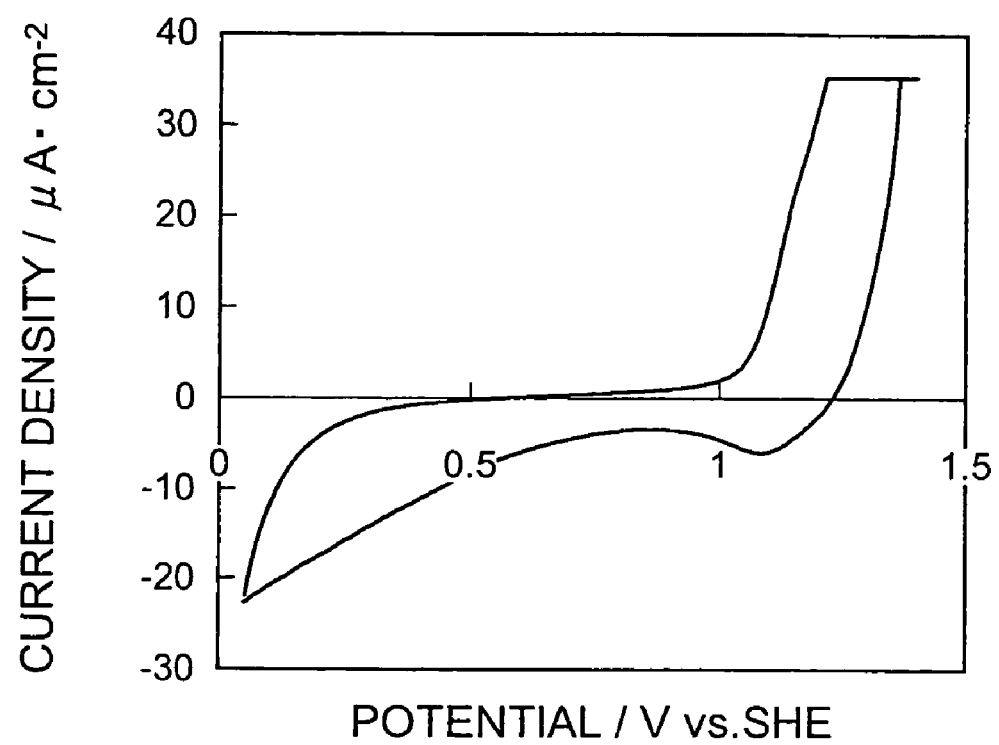
[FIG. 2] A graph showing the relationship between potential and current density in the 50th cycle of potential sweeping in Example 1.

Next, using thus obtained multilayer body in which the precursor layer was formed on the disk electrode as a working electrode, platinum as a counter electrode, a standard hydrogen electrode (SHE) as a reference electrode, and an oxygen-saturated 0.5-M aqueous sulfuric acid solution as an electrolyte, the multilayer body was provided with a potential by 50 cycles of potential sweeping at 100 mV/s within the range of 1.4 V to 0.05 V. This formed a catalyst layer, thereby completing the making of the electrode. FIG. 2 shows the relationship between potential and current density in the 50th cycle of potential sweeping.

Example 2

Figure 3:
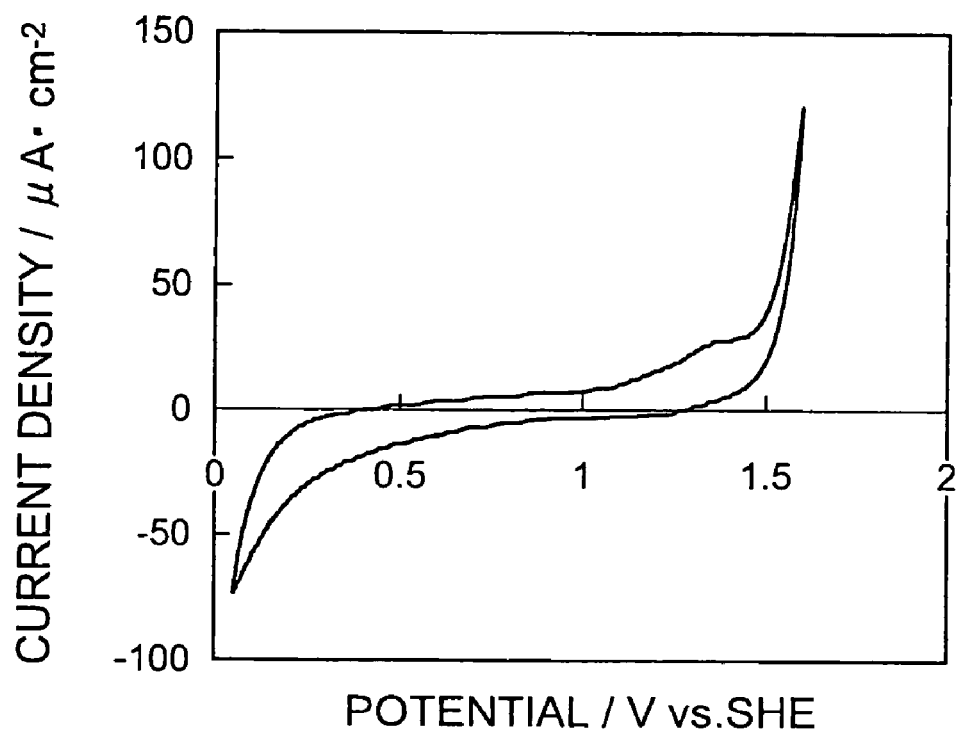
[FIG. 3] A graph showing the relationship between potential and current density in the 50th cycle of potential sweeping in Example 2.

The electrode of Example 2 was made as in Example 1 except that potential sweeping for the multilayer body was carried out within the range of 1.6 V to 0.05 V. FIG. 3 shows the relationship between potential and current density in the 50th cycle of potential sweeping in Example 2.

Example 3

As a metal complex, 20 mg of 5,10,15,20-tetraphenylporphyrinatocobalt(II) (manufactured by Aldrich) were dissolved in 10 ml of N-methylpyrrolidone, so as to prepare a coating liquid. This coating liquid was applied dropwise onto a disk electrode having a diameter of 6 mm made of glassy carbon, so as to form a uniform coating, which was then dried, so as to form a precursor layer made of a metal complex. Here, from the change in weight between before and after forming the precursor layer, it was proved that the amount of coating of the metal complex was 20 μg/cm².

Next, using thus obtained multilayer body in which the precursor layer was formed on the disk electrode as a working electrode, platinum as a counter electrode, a standard hydrogen electrode (SHE) as a reference electrode, and an oxygen-saturated 0.5-M aqueous sulfuric acid solution as an electrolyte, the multilayer body was provided with a potential by 50 cycles of potential sweeping at 100 mV/s within the range of 1.4 V to 0.05 V. This formed a catalyst layer, thereby completing the making of the electrode.

Example 4

As a metal complex, 20 mg of 5,10,15,20-tetraphenylporphyrinatoiron(III) chloride (manufactured by Aldrich) were dissolved in 10 ml of N-methylpyrrolidone, so as to prepare a coating liquid. This coating liquid was applied dropwise onto a disk electrode having a diameter of 6 mm made of glassy carbon, so as to form a uniform coating, which was then dried, so as to form a precursor layer made of a metal complex. Here, from the change in weight between before and after forming the precursor layer, it was proved that the amount of coating of the metal complex was 20 μg/cm².

Next, using thus obtained multilayer body in which the precursor layer was formed on the disk electrode as a working electrode, platinum as a counter electrode, a standard hydrogen electrode (SHE) as a reference electrode, and an oxygen-saturated 0.5-M aqueous sulfuric acid solution as an electrolyte, the multilayer body was provided with a potential by 50 cycles of potential sweeping at 100 mV/s within the range of 1.4 V to 0.05 V. This formed a catalyst layer, thereby completing the making of the electrode.

Example 5

As a metal complex, 20 mg of nickel(II)phthalocyanine (manufactured by Aldrich) were dissolved in 10 ml of N-methylpyrrolidone, so as to prepare a coating liquid. This coating liquid was applied dropwise onto a disk electrode having a diameter of 6 mm made of glassy carbon, so as to form a uniform coating, which was then dried, so as to form a precursor layer made of a metal complex. Here, from the change in weight between before and after forming the precursor layer, it was proved that the amount of coating of the metal complex was 20 μg/cm².

Next, using thus obtained multilayer body in which the precursor layer was formed on the disk electrode as a working electrode, platinum as a counter electrode, a standard hydrogen electrode (SHE) as a reference electrode, and an oxygen-saturated 0.5-M aqueous sulfuric acid solution as an electrolyte, the multilayer body was provided with a potential by 50 cycles of potential sweeping at 100 mV/s within the range of 1.4 V to 0.05 V. This formed a catalyst layer, thereby completing the making of the electrode.

Comparative Example 1

The electrode of Comparative Example 1 was made as in Example 1 except that no potential sweeping was effected for the multilayer body.

Comparative Examples 2 to 4

The electrodes of Comparative Examples 2 to 4 were made as in Example 1 except that potential sweeping for their multilayer bodies was effected within the ranges of 1.1 V to 0.05 V, 1.2 V to 0.05 V, and 1.3 V to 0.05 V, respectively.

Measurement of Oxygen Reduction Current Density

In Examples 1 to 5 and Comparative Examples 1 to 4, the oxygen reduction current density at 0.05 V was measured. Table 1 shows thus obtained results.

TABLE 1

| | Max. sweeping potential value (V vs. SHE) | Oxygen reduction current density (μA · cm$^{-2}$) |
|---|---|---|
| Example 1 | 1.4 | 22.0 |
| Example 2 | 1.6 | 73.2 |
| Example 3 | 1.4 | 138.0 |
| Example 4 | 1.4 | 52.3 |
| Example 5 | 1.4 | 61.5 |
| Comparative Example 1 | — | 0.19 |
| Comparative Example 2 | 1.1 | 0.16 |
| Comparative Example 3 | 1.2 | 0.10 |
| Comparative Example 4 | 1.3 | 0.16 |

As can be seen from the results shown in Table 1, it has been proved that the electrodes of Examples 1 to 5 yield oxygen reduction current densities much greater than those of the electrodes of Comparative Examples 1 to 4.

Evaluation of Current Density

Figure 4:
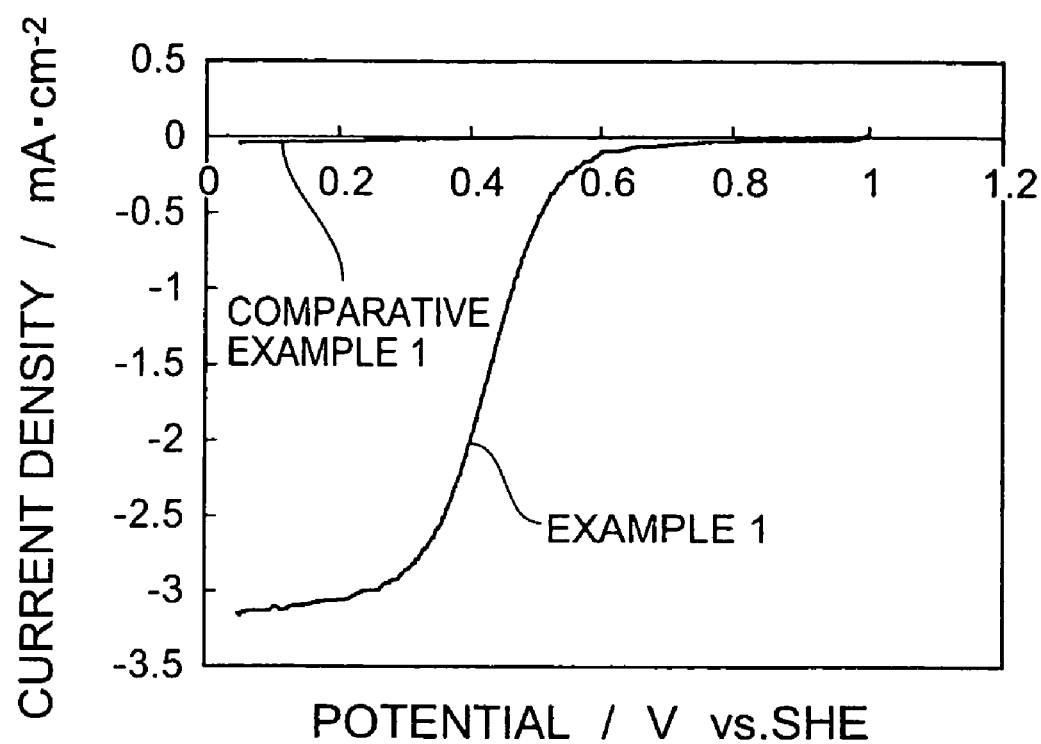
[FIG. 4] A graph showing the relationship between potential and current density in each of the electrodes of Example 1 and Comparative Example 1.

Using the electrodes of Examples 1, 4, and 5 and Comparative Example 1 as rotary disk electrodes, cyclic voltammetry was effected at 100 mV/s within the potential range of 1.0 V to 0.05 V, so as to measure their oxygen reduction current densities. This was done by using each of the electrodes of Examples 1, 4, and 5 and Comparative Example 1 as a working electrode, platinum as a counter electrode, a standard hydrogen electrode (SHE) as a reference electrode, and an oxygen-saturated 0.5-M aqueous sulfuric acid solution as an electrolyte. FIG. 4 shows the relationship between potential and current density in each of the electrodes of Example 1 and Comparative Example 1. Here, it has been proved that a substantially fixed current flows in a region where the potential is 0.2 V or less in each of the electrodes of Example 1 and Comparative Example 1, thereby reaching the limiting diffusion current. Table 2 shows the current density at 2500 rpm when the potential is 0.2 V in each of the cases using the respective electrodes of Examples 1, 4, and 5 and Comparative Example 1.

TABLE 2

|  | Current density at 0.2 V (mA · cm$^{-2}$) |
| --- | --- |
| Example 1 | 3.06 |
| Example 4 | 1.06 |
| Example 5 | 1.22 |
| Comparative Example 1 | 0.027 |

As can be seen from the results shown in Table 2, it has been proved that the electrodes of Examples 1, 4, and 5 yield improved oxygen reduction current densities at 0.2 V (based on SHE) as compared with the electrode of Comparative Example 1.

The foregoing have proved that the method of manufacturing a fuel cell in accordance with the present invention can improve the current density of the resulting electrode.

Since the cathode is formed by the method of manufacturing the cathode in accordance with the present invention, the method of manufacturing a fuel cell in accordance with the present invention can improve the current density of the resulting fuel cell.

INDUSTRIAL APPLICABILITY

As explained in the foregoing, the present invention can provide a method of manufacturing a cathode for a fuel cell which can improve the current density, and a method of manufacturing a fuel cell which can improve the energy density.

The invention claimed is:

1. A method of manufacturing a cathode for a fuel cell equipped with a catalyst layer containing a catalyst, the method including:
   a precursor layer forming step of forming the precursor layer by a coating method using a coating liquid made of the catalyst and a solvent adapted to dissolve or disperse the catalyst prior to the potential providing step; and
   a potential providing step of providing the precursor layer containing the catalyst with a potential higher than 1.3 V with reference to a standard hydrogen electrode, so as to form the catalyst layer, wherein
   in the precursor layer forming step, a pre-formed metal complex is used as the catalyst in the coating liquid and is applied as is to form the precursor layer, and
   in the potential providing step, the precursor layer is provided with the potential by potential sweeping, which is performed in an oxygen-saturated aqueous sulfuric acid solution.

2. A method of manufacturing a cathode for a fuel cell according to claim 1, wherein the precursor layer is provided with a potential of 1.6 V or less with reference to the standard hydrogen electrode in the potential providing step.

3. A method of manufacturing a cathode for a fuel cell according to claim 1, wherein the metal complex has a porphyrin ring or phthalocyanine ring.

4. A method of manufacturing a cathode for a fuel cell according to claim 3, wherein the metal complex includes at least one species of metal selected from the group consisting of Co, Fe, Ni, Cu, Mn, V, and Ru as a center metal.

5. A method of manufacturing a fuel cell comprising an anode, a cathode, and a solid polymer electrolyte membrane arranged between the anode and the cathode,
   the method including an electrolyte forming step of forming the cathode by the method of manufacturing a cathode for a fuel cell according to claim 1.

* * * * *